Dec. 6, 1955  B. W. OLSON  2,726,022
SPARE TIRE CARRIER FOR TRUCKS, BUSES, AND THE LIKE
Filed Nov. 12, 1952  2 Sheets-Sheet 1
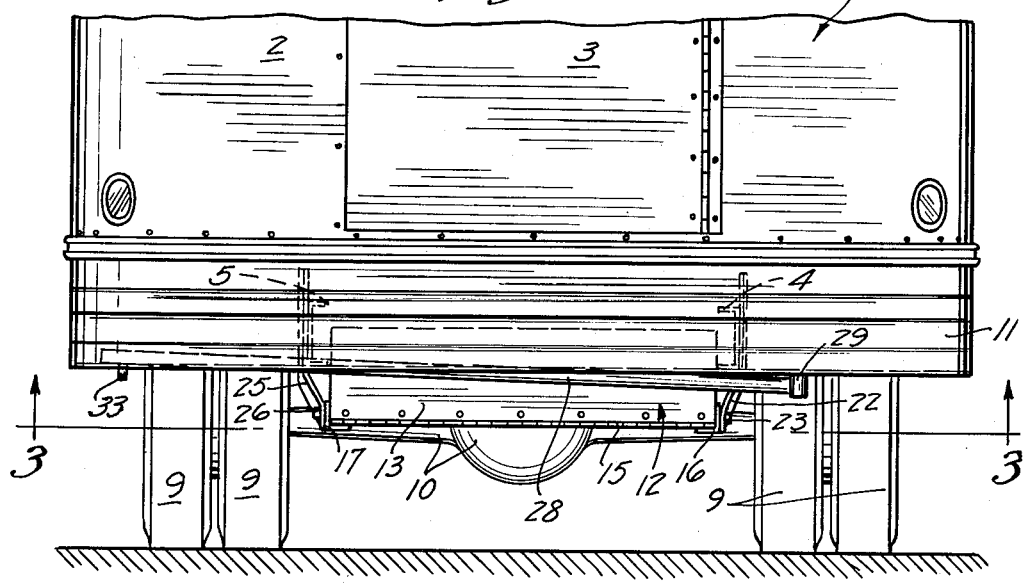
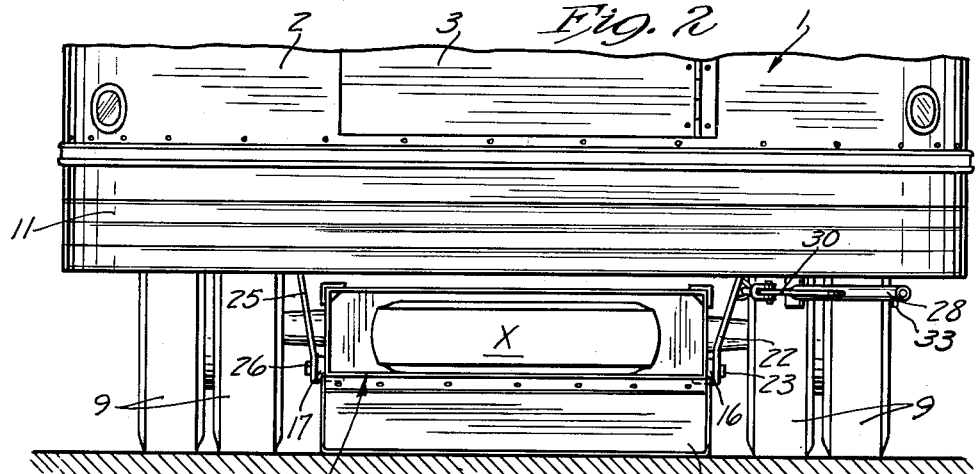
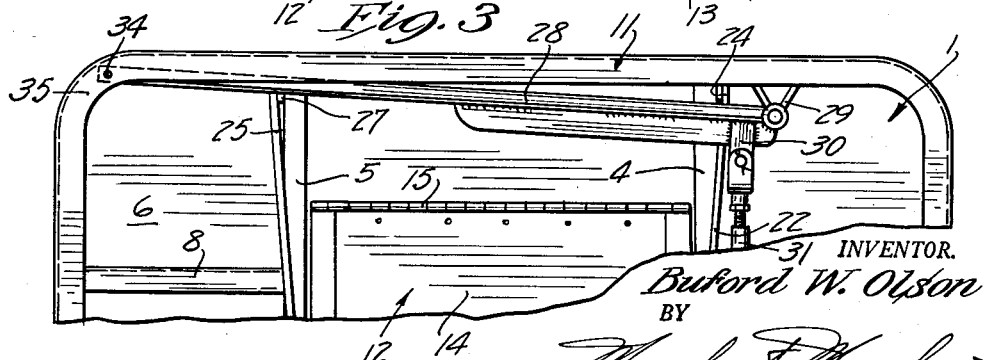
INVENTOR.
Buford W. Olson
BY
Merchant & Merchant
ATTORNEYS

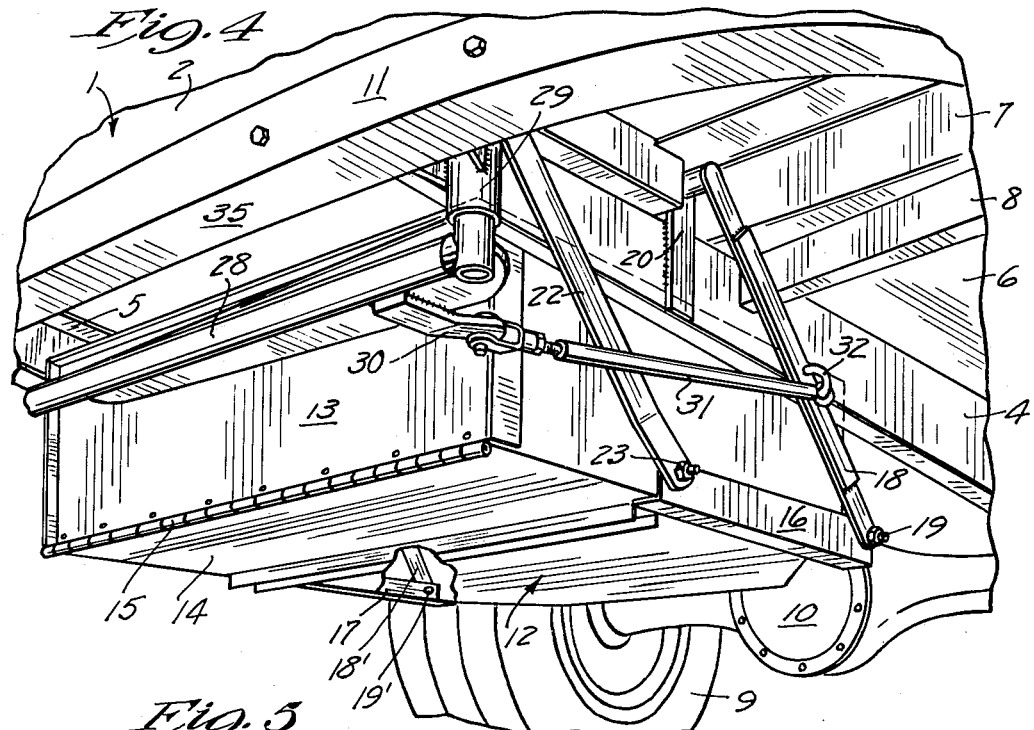
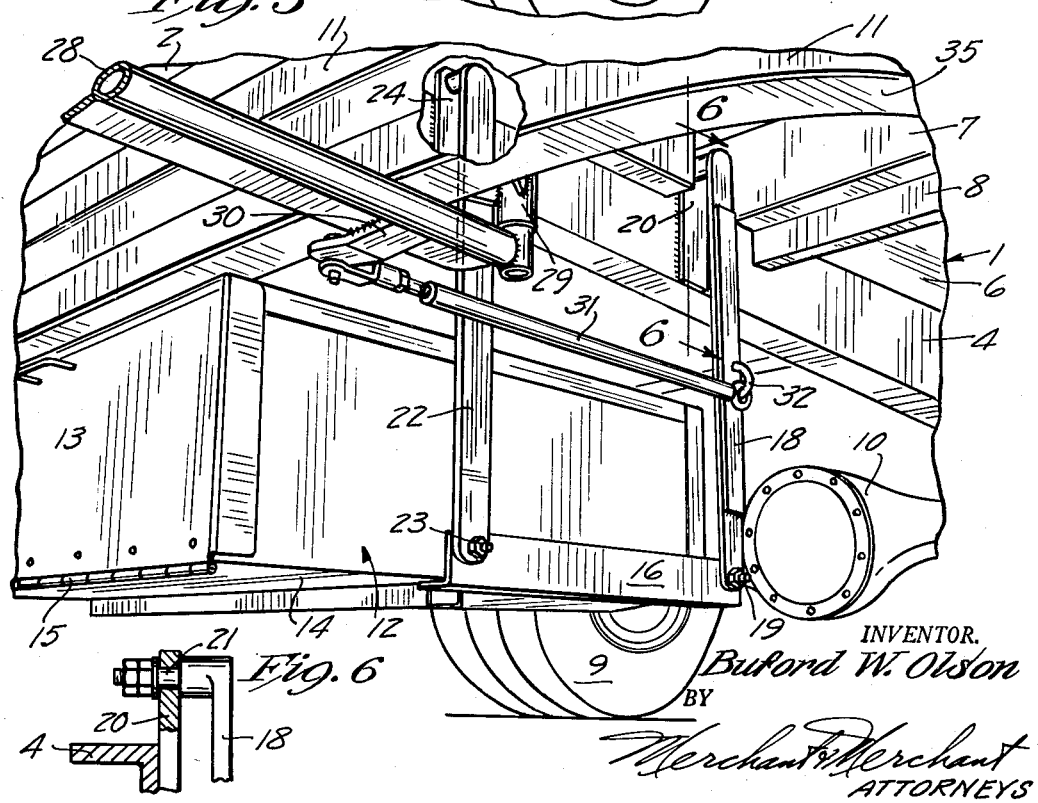

United States Patent Office 2,726,022
Patented Dec. 6, 1955

2,726,022

SPARE TIRE CARRIER FOR TRUCKS, BUSES, AND THE LIKE

Buford W. Olson, Minneapolis, Minn., assignor to Chas. Olson & Sons, Inc., Minneapolis, Minn., a corporation of Minnesota Application November 12, 1952, Serial No. 319,878

1 Claim. (Cl. 224—42.21)

My invention relates generally to spare tire carrying devices for wheel mounted vehicles and more particularly to spare tire carriers for trucks, buses and the like.

Trucks and buses generally are provided with racks for supporting spare tires either within the bodies thereof or under the floor of said bodies in positions where they do not occupy space otherwise utilized for the pay load of the vehicle. In most instances, these tire racks are stationary and located adjacent one side or the other of the vehicle between the front and rear wheels thereof. With arrangements of this type, when it is necessary to change a tire on the highway, the operator of the vehicle generally drives the vehicle onto the shoulder of the highway. In many instances the edge of the shoulder defines the margin of a ditch on the bank of which the operator finds at best a very precarious footing. If the shoulder terminates in an upwardly extending wall or in a snow bank, the truck must be left partially on the road so that the operator is afforded access to the spare tire or wheel. Obviously this condition creates a traffic hazard. If the tire rack is on the opposite side of the vehicle, the operator, in removing the tire therefrom and replacing the injured tire therein, is in danger from other vehicles traveling on the road. From a tire or wheel changing standpoint, the most advantageous vocation for the spare wheel or tire is at the rear end portion of the vehicle. However, in the case of many trucks, semi-trailers and buses, relatively heavy skirts or bumpers extend across the rear ends thereof, such bumpers being relatively close to the ground. Inasmuch as a tire rack placed below the plane of the bottom of the skirt or bumper would provide insufficient road clearance, the rack at the rear end of the vehicle would necessarily be placed forwardly of the skirt and at least partially above the plane of the lower end thereof, thereby causing difficulty in removal from and replacement thereinto of a relatively heavy tire, or the rack would be placed above said skirt where it would occupy space otherwise usable for a pay load. Furthermore a tire rack placed above the skirt or bumper would necessitate an undue amount of effort by the operator in lifting a tire equipped wheel thereinto. An important object of my invention is, therefore, the provision of a spare tire carrier for vehicles which may quickly and easily be moved between a tire receiving and delivery position in close proximity to the ground and a tire storing position under the floor of the body of the vehicle inwardly and upwardly of its tire receiving and delivery position.

Another object of my invention is the provision of novel means for supporting and guiding a tire rack as set forth whereby the tire rack may be moved between an outwardly projected tire receiving and delivery position and an inwardly retracted tire storing position below the floor of the vehicle body.

Still another object of my invention is the provision of novel mechanism for moving a spare tire carrying device of the above type between its projected and retracted positions.

A still further object of my invention is the provision of simple and effective means for locking a spare tire carrying device of the type set forth in its retracted tire storing position.

Another object of my invention is the provision of a movable tire carrying rack and mechanism associated therewith which is simple and inexpensive to manufacture, which is efficient in operation, and which is rugged in construction and durable in use.

The above and still further highly important objects and advantages of my invention will become apparent from the following detailed specification, appended claim and attached drawings.

Referring to the drawings in which like characters indicate like parts throughout the several views:

Fig. 1 is a fragmentary view in rear elevation showing my novel tire rack in its retracted tire storing position on the rear end portion of a bus or similar vehicle;

Fig. 2 is a view corresponding to Fig. 1 but showing my novel tie rack in its tire receiving and delivery position;

Fig. 3 is a fragmentary view in bottom plan as seen from the line 3—3 of Fig. 1;

Fig. 4 is a fragmentary view in perspective of the under side of the vehicle of Figs. 1 to 3 inclusive and showing my novel tire carrying device in its retracted tire storing position;

Fig. 5 is a view corresponding to Fig. 4 showing my novel tire carrying device in its downwardly and outwardly projected tire receiving and delivery position; and Fig. 6 is a fragmentary detail taken substantially on the line 6—6 of Fig. 5.

Referring with greater detail to the drawings, the numeral 1 indicates in its entirety a wheel mounted vehicle such as a transport truck, semi-trailer or passenger bus. For the purpose of the present example it may be assumed that the vehicle 1 is in the nature of a passenger bus, the rear wall 2 of which is provided with an emergency door 3 as shown in Figs. 1 and 2. The frame of the chassis of the bus 1 includes a pair of longitudinally extending relatively heavy frame members 4 and 5 that underlie and support the floor 6 of the vehicle through cross frame members 7 and brace members 8. Pneumatic tire-equipped dual wheels 9 are shown as being disposed at opposite ends of conventional rear axle and differential gear housing 10. A depending skirt 11 of relatively heavy metal provides a bumper extending across the rear end of and at least partially forwardly of the rear end at the opposite sides of the body of the vehicle 1 below the level of the floor 6 thereof.

My novel spare tire carrying device includes a generally rectangular receptacle or box 12 having a closure 13 hinged along its bottom edge to the bottom wall 14 of the box as indicated at 15. The closure 13 normally closes the open rear end of the box 12 and may be locked in its closed position by any suitable means not shown. The receptacle or box 12 is preferably made from reinforced sheet metal and is provided with a pair of angle irons 16 and 17 adjacent its opposite sides and rigidly secured to the bottom wall 14 of the box by welding or the like. As indicated in Figs. 4 and 5, the angle irons or bars 16 and 17 extend in a direction longitudinally of the vehicle 1. A rigid arm 18 is pivotally secured at its lower end to the front end portion of the angle bar 16 as indicated at 19, and at its upper end is pivotally secured to the upper end of a bearing member 20 as indicated at 21, see Figs. 4 to 6 inclusive. The bearing member 20 is welded or otherwise rigidly anchored to the frame member 4. It should be noted that the axis of the pivotal connection 19 is parallel to the axis of the pivotal connection 21, the purpose of which will hereinafter become apparent. A rigid supporting arm 22 similar to the arm 18 is pivotally secured at its lower end to the rear end portion of the angle bar 16 as indicated at 23 for swinging movements with respect thereto about an axis parallel to the axes of the pivotal connections 19 and 21. At its upper end, the supporting arm 22 is pivotally secured to a bearing member 24 similar in all respects to the bearing member 20 and for swinging movements about an axis parallel to the axes of the four mentioned pivotal connections. The supporting arm 18 is one of a front pair of said arms, the other of which is shown fragmentarily in Fig. 4 and indicated by the numeral 18', its lower end pivotally secured to the front end of the angle bar 17 as indicated at 19' on an axis common to the axis of the pivotal connection 19. It may be assumed that the upper end of the arm 18' is pivotally secured to the frame member 5 in a manner similar to the pivotal connection of its cooperating arm 18 for swinging movements about an axis common to the axis of the pivotal connection 21. In like manner, the rear supporting arm 22 is one of a rear pair thereof, the other of which is shown in part in Figs. 2 and 3 and indicated at 25. The lower end of the arm 25 is pivotally secured to the angle bar 17 as indicated at 26 for swinging movements about an axis common to the axis of the pivotal connection 23 of its cooperating rear arm 22. At its upper end, the rear arm 25 is pivotally connected to a bearing member 27 for swinging movements about an axis common to the axis of swinging movement between the arm 22 and the bearing member 24. Preferably, the arms 18 and 18' of the front pair thereof are of equal length and equal to the length of the arms 22 and 25 of the rear pair. The front pair of arms are also parallel to those of the rear pair thereof whereby to provide a parallelogram arrangement which maintains the receptacle 12 in a substantially horizontal position at all times.

With reference to Figs. 4 and 5 it will be seen that the supporting arms mount the receptacle 12 for swinging movements between an inwardly and upwardly retracted tire storing position and a rearwardly, outwardly and downwardly projected tire receiving and delivery position wherein the top of the receptacle 12 is below the plane of the bottom of the skirt 11. In this position, and as shown in Figs. 3 and 5, the rear end of the receptacle 12 is substantially even with the skirt or bumper 11. In this position of the receptacle 12, the closure 13 thereof is within easy reach of the operator and the spare tire, indicated at X in Fig. 2 may be easily withdrawn from the receptacle and the damaged tire or tire-equipped wheel may be inserted therein. It will be further noted with reference particularly to Figs. 4 and 5 that the arrangement of the front and rear pairs of supporting arms is such that the receptacle 12 is gravity biased toward its rearwardly projected tire receiving and delivery position of Figs. 2 and 5, the supporting arms being in a substantially vertical position when the receptacle is positioned thusly.

I provide means for moving the receptacle 12 between its above mentioned positions, said means comprising a manually operated lever and linkage operatively connecting the same to the receptacle. The lever, indicated by the reference character 28 is pivotally connected at one end to a bearing element 29 welded or otherwise rigidly secured to the depending skirt or bumper 11. The lever 28 is provided with a relatively short laterally extended lever arm 30 to the outer end of which is pivotally secured one end of a rigid link 31 which has its other end pivotally connected to a connector loop or the like 32 rigidly anchored to the intermediate portion of the supporting arm 18, see Figs. 4 and 5. The lever 28 is movable between a receptacle retracted position transversely of the vehicle body, as indicated in Figs. 1, 3 and 4 and a rearwardly extended receptacle projected position as shown in Figs. 2 and 5. When the lever 28 is moved to its receptacle retracted position of Figs. 1, 3 and 4, it will be seen that the receptacle is moved inwardly and upwardly against gravity bias to a point where the top portion of the receptacle 12 is contained between the frame members 4 and 5 and the clearance between the ground and the bottom 14 of the receptacle is greater than the normal road clearance of the vehicle, that is, the clearance between the axle housing 10 and the ground. The pivotal connection between the lever 28 and the bearing 29 is sufficiently loose to permit the free end portion of the lever 28 to be raised slightly so that a depending pin 33 may be made to extend downwardly through a pin receiving aperture 34 in the inturned bottom 35 of the skirt 11 to securely lock the lever in its receptacle retracted position, see Figs. 1 and 3.

With the above arrangement, it will be seen that a spare tire may be conveniently carried at the rear end portion of the vehicle without detracting from the appearance thereof and enabling the operator to store the spare tire with a minimum of physical effort and with a minimum of danger.

My novel invention has been thoroughly tested and found to be completely satisfactory for the accomplishment of the objectives set forth; and while I have shown and described a commercial embodiment of my novel spare tire supporting device, it will be understood that the same is capable of modification without departure from the spirit and scope of the invention as defined in the claim.

What I claim is:

In a spare tire carrier for vehicles, a receptacle adapted to contain a spare tire for said vehicle, means mounting said receptacle to the under side of the vehicle adjacent its rear end for movements between a forwardly and upwardly retracted tire storing position and a rearwardly and downwardly projected tire receiving and delivery position, said means comprising a front pair of laterally spaced arms mounted at their upper ends to said vehicle for swinging movements about a common axis and a rear pair of laterally spaced arms mounted at their upper ends to said vehicle for swinging movements about a common axis parallel to the axis of swinging movement of said front pair of arms, one arm of each pair being disposed laterally outwardly of an adjacent side of said receptacle, the lower ends of said arms being pivotally secured to the receptacle on axes parallel to said first-mentioned axes, whereby said receptacle is gravity biased toward its rearwardly and downwardly projected receiving and delivery position, mechanism for moving said receptacle between its retracted tire storing position and its rearwardly and downwardly projected receiving and delivery position, said mechanism comprising a lever pivotally mounted to the vehicle body for swinging movement about a vertical axis and between a position substantially parallel to the rear wall of the vehicle and a second position generally longitudinally of the vehicle, and a rigid link pivotally connected at one end to said lever and at its other end to one of said arms, and means for positively locking said lever in its position parallel to the rear wall of the vehicle, said last-mentioned means including a pin and a recess therefor, one on said lever and the other on said vehicle body.

References Cited in the file of this patent

UNITED STATES PATENTS

| | | |
|---|---|---|
| 1,879,304 | Kennedy et al. | Sept. 27, 1932 |
| 2,028,945 | Morrison | Jan. 28, 1936 |
| 2,198,572 | Gross | Apr. 23, 1940 |